(12) United States Patent
Wilson et al.

(10) Patent No.: US 7,599,561 B2
(45) Date of Patent: Oct. 6, 2009

(54) COMPACT INTERACTIVE TABLETOP WITH PROJECTION-VISION

(75) Inventors: Andrew D. Wilson, Seattle, WA (US); Steven Bathiche, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 494 days.

(21) Appl. No.: 11/363,750

(22) Filed: Feb. 28, 2006

(65) Prior Publication Data
US 2007/0201863 A1  Aug. 30, 2007

(51) Int. Cl.
*G06K 9/48* (2006.01)
*G06K 9/32* (2006.01)

(52) U.S. Cl. .................. 382/199; 382/293

(58) Field of Classification Search .............. 382/100, 382/151, 199, 286, 294, 295, 296, 293, 276; 396/429
See application file for complete search history.

(56) References Cited

U.S. PATENT DOCUMENTS

| | | | |
|---|---|---|---|
| 4,775,217 A | 10/1988 | Ellis | |
| 5,949,389 A | 9/1999 | Brown | |
| 6,359,737 B1 | 3/2002 | Stringfellow | |
| 6,567,083 B1 | 5/2003 | Baum et al. | |
| 7,218,792 B2 * | 5/2007 | Raskar et al. | 382/254 |
| 2002/0076105 A1 * | 6/2002 | Lee | 382/190 |
| 2002/0084330 A1 * | 7/2002 | Chiu | 235/462.11 |
| 2002/0180727 A1 | 12/2002 | Guckenberger et al. | |
| 2004/0166914 A1 | 8/2004 | Ishihata et al. | |
| 2004/0174599 A1 | 9/2004 | Dietrich | |
| 2005/0013484 A1 | 1/2005 | Ohkawa | |

FOREIGN PATENT DOCUMENTS

WO   2005055616   6/2005

OTHER PUBLICATIONS

Virtual Devices, Inc. http://www.innovationworks.org/html/portfolio/virtual/virtual.jsp last viewed Feb. 20, 2006, 1 page.
Barron, et al. "Performance of Optical Flow Techniques" (1992) Computer Vision and Pattern Recognition, pp. 236-242.
Berard. "The Magic Table: Computer Vision Based Augmentation of a Whiteboard for Creative Meetings" IEEE International Conference in Computer Vision, Workshop on Projector-Camera Systems (PROCAMS'03), 8 pages.
Raskar, et al. "A Low-Cost Projector Mosaic with Fast Registration" (2002) Mitsubishi Electronic Research Laboratories, Proceedings of the 5th Asian Conference on Computer Vision, 8 pages.

(Continued)

*Primary Examiner*—Yon Couso
(74) *Attorney, Agent, or Firm*—Lee & Hayes, PLLC

(57) ABSTRACT

The subject application relates to a system(s) and/or methodology that facilitate vision-based projection of any image (still or moving) onto any surface. In particular, a front-projected computer vision-based interactive surface system is provided which uses a new commercially available projection technology to obtain a compact, self-contained form factor. The subject configuration addresses installation, calibration, and portability issues that are primary concerns in most vision-based table systems.

20 Claims, 14 Drawing Sheets

OTHER PUBLICATIONS

Corso, et al. "The 4D Touch-pad: Unencumbered HCI with VIC's" (2003) Proceedings of the CVPR-HCI Workshop, 6 pages.

Dietz, et al. "A Multi-User Touch Technology" (2001) ACM Symposium on User Interface Software and Technology, pp. 219-226.

Tomasi, et al. "Full-Size Project Keyboard for Handheld Devices" (2003) Communications of the ACM, pp. 70-75.

Zhang, et al. "Visual Panel: Virtual Mouse, Keyboard and 3D Controller with an Ordinary Piece of Paper" (2001) Workshop on Perceptual User Interfaces, 8 pages.

Horn. "Closed Form Solution of Absolute Orientation Using Unit Quaternons" (1987) Journal of the Optical Society 4(4), pp. 629-642.

Kang. "Radical Distortion Snakes" (2000) IEICE Transactions on Information and Systems, E84-D (12), pp. 1603-1611.

Wu, et al. "Multi-finger and Whole Hand Gesture Interaction Techniques for Multi-User Tabletop Displays" (2003) ACM Symposium on User Interface Software and Technology, pp. 193-202.

Kim, et al. "Video-based Document Tracking: Unifying Your Physical and Electronic Desktops" (2004) Proceedings of ACM Symposium on User Interface Software and Technology, pp. 99-107.

Kjeldsen, et al. "Interacting with Steerable Projected Displays" International Conference on Automatic Face and Gesture Recognition, 6 pages, (2002).

Klemmer, et al. "The Designer's Output: A Tangible Interface for Collaborative Web Site Design" (2001) ACM Symposium on User Interface Software and Technology, pp. 1-10.

Koike, et al. "Integrating Paper and Digital Information on EnhancedDesk: A Method for Realtime Finger Tracking on an Augmented Desk System" (2001) ACM Transactions on Computer-Human Interaction (TOCHI) 8(4), pp. 307-322.

Leibe, et al. "Spontaneous Interaction with the Perceptive Workbench" (2000) IEEE Computer Graphics and Applications 20(6), pp. 54-65.

Letessier, et al. "Visual Tracking of Bare Fingers for Interactive Surfaces" (2004) ACM Symposium on User Interface Software and Technology, 10 pages.

Lowe. "Distinctive Image Features from Scale-Invariant Keypoints" (2004) International Journal of Computer Vision 60(2), pp. 91-110.

Malik, et al. "A Two-handed Gestural Input Device" (2004) Proceedings of the International Conference on Multimodal Interfaces, pp. 289-296.

Matsushita, et al. "HoloWall: Designing a Finger, Hand, Body and Object Sensitive Wall" (1997) ACM Symposium on User Interface Software and Technology (UIST), 2 pages.

Newman, et al. "A Desk Supporting Computer-based Interaction with Paper Documents" (1992) CHI'92, 6 pages.

Owen, et al. "What is the Best Fiducial?"(2002) Augmented Reality Toolkit, the First IEEE International Workshop, 8 pages.

Patten, et al. "Sensetable: A Wireless Object Tracking Platform for Tangible User Interfaces" (2001) Proceedings of CHI 2001, pp. 253-260.

Rekimoto. "SmarkSkin: An Infrastructure for Freehand Manipulation on Interactive Surfaces" (2002) Proceedings of CHI 2002, pp. 113-120.

Rekimoto, et al. "Augmented Surfaces: A Spatially Continuous Workspace for Hybrid Computing Environments" (1999) Proceedings of CHI '99, pp. 378-385.

Rekimoto, et al. "CyberCode: Designing Augmented Reality Environments with Visual Tags" (2000) Designing Augmented Reality Environments (DARE 2000), 10 pages.

Wren, et al. "Volumetric Operations with Surface Margins" (2001) Computer Vision and Pattern Recognition: Technical Sketched, 6 pages.

Segen, et al. "Shadow Gestures: 3D Hand Pose Estimation Using a Single Camera" (1999) Proceedings of Computer Vision and Pattern Recognition, pp. 479-485.

Tomasi, et al. "Full-size Projection Keyboard for Handheld Devices" (2003) Communications of the ACM 46(7), pp. 70-75.

Ukita, et al. "Wearable Virtual Tablet: Fingertip Drawing on a Portable Plane-Object Using an Active-Infrared Camera" (2004) Proceedings of Intelligent User Interfaces, pp. 169-176.

Ulmer, et al. "The metaDESK: Models and Prototypes for Tangible user Interfaces" (1997) ACM Symposium on User Interface Software and Technology, pp. 223-232.

Underkoffler, et al. "Illuminating Light: An Optical Design Tool with a Luminous-Tangible Interface" (1998) Proceedings of the ACM 98 Human Factors in Computing Systems Conference, pp. 542-549.

Wellner. "Interacting with Paper on the DigitalDesk" (1993) Communications of the ACM 36(7), pp. 86-97.

Wilson. "FlowMouse: A Computer Vision-Based Pointing and Gesture Input Device" (2005) Interact, 14 pages.

Wilson. "TouchLight: An Imaging Touch Screen and Display for Gesture-Based Interaction"(2004) International Conference on Multimodal Interfaces, 8 pages.

Ballard, et al. "Computer Vision" (1982) Prentice Hall.

Fiala. "ARTag Revision 1, A Fiducial Marker System Using Digital Techniques" (2004) NCR Technical Report (NCR 47419) National Research Council of Canada, 48 pages.

Robinson, et al. "The LivePaper System: Augmenting Paper on and Enhanced Tabletop" (2001) Computers and Graphics, pp. 731-743.

Kato, et al. "Virtual Object Manipulation on a Table-Top AR Environment" (2000) Proceedings of ISAR 2000, 9 pages.

Gonzalez, et al. "Digital Image Processing: Second Edition" (2002) Prentice-Hall.

* cited by examiner

COMPACT INTERACTIVE TABLETOP WITH PROJECTION-VISION

BACKGROUND

The advent of novel sensing and display technology has encouraged the development of a variety of interactive systems which move the input and display capabilities of computing systems on to everyday surfaces such as walls and tables. The manner in which this has been done in current systems indicates an attempt to address design and integration objectives. However, such systems remain deficient in their variety of sensing capabilities, suitability to easy installation and calibration, and/or usability of the systems among consumers.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate sensing of objects and co-location of projection of any image (still or moving) onto any surface. In particular, a front-projected computer vision-based interactive table system is provided which uses a new commercially available projection technology to obtain a compact, self-contained form factor. The subject configuration addresses installation, calibration, and portability issues that are primary concerns in most vision-based table systems. More specifically, the projector and cameras, as well as computing resources such as CPU and storage, can be built into the same compact device. This combined projecting and sensing pod may be readily placed on any flat surface in the user's environment and requires no calibration of the projection or sensing system. It is this portability, ease of installation, and ability to utilize any available surface without calibration that tends to be more important or even required for mainstream consumer acceptance. For example, imagine a child pulling such a device out of the closet and placing it on a table or the floor of their room to transform the nearby surface into an active play, school work, or entertainment space.

The subject system is capable of sensing a variety of objects and displaying animated graphics over a large display surface and uses a new commercially available projection technology to obtain an exceptionally compact, self-contained form factor. Unlike many other conventional systems, this system may be quickly set up to operate on any flat surface, requires no calibration beyond the factory, and is compact while still displaying and sensing over a large surface area such as a wall, floor, or elevated surface (e.g., platform, table, or desk). These features make it especially attractive in consumer applications, where distribution, installation, mounting, and calibration considerations tend to be paramount.

Furthermore, image processing techniques for front-projected vision-based table systems are also provided. These techniques include a shadow-based touch detection algorithm, a fast and uncomplicated visual bar code scheme tailored to projection-vision table systems, the ability to continuously track sheets of paper, and an optical flow-based algorithm for the manipulation of onscreen objects that does not rely on fragile tracking algorithms.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

Figure 1:
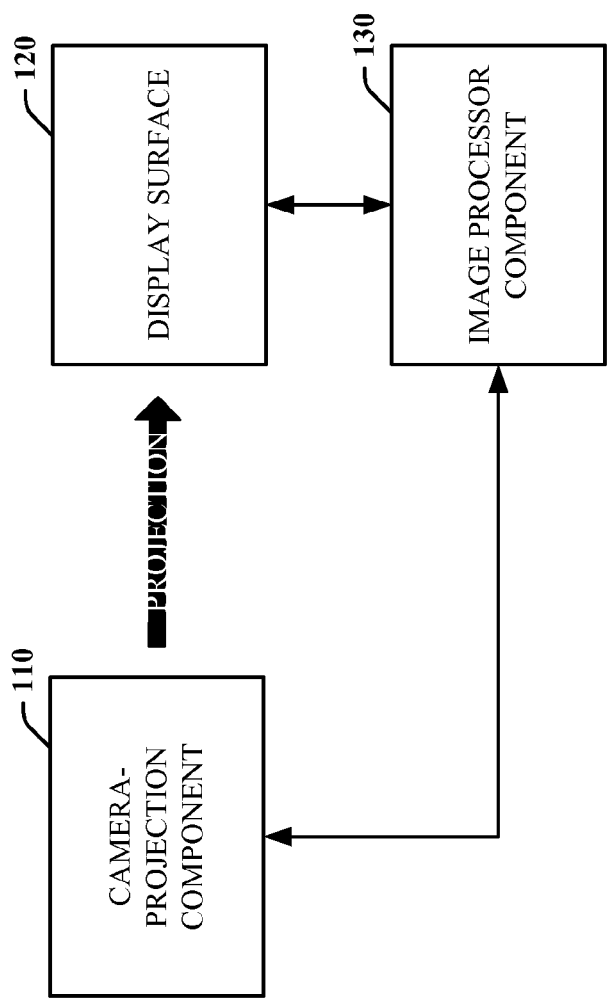
FIG. 1 is a block diagram of a projection-vision system that can sense and display objects onto any surface using a unique front projection assembly to facilitate creating an interactive surface or workspace.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Figure 2:
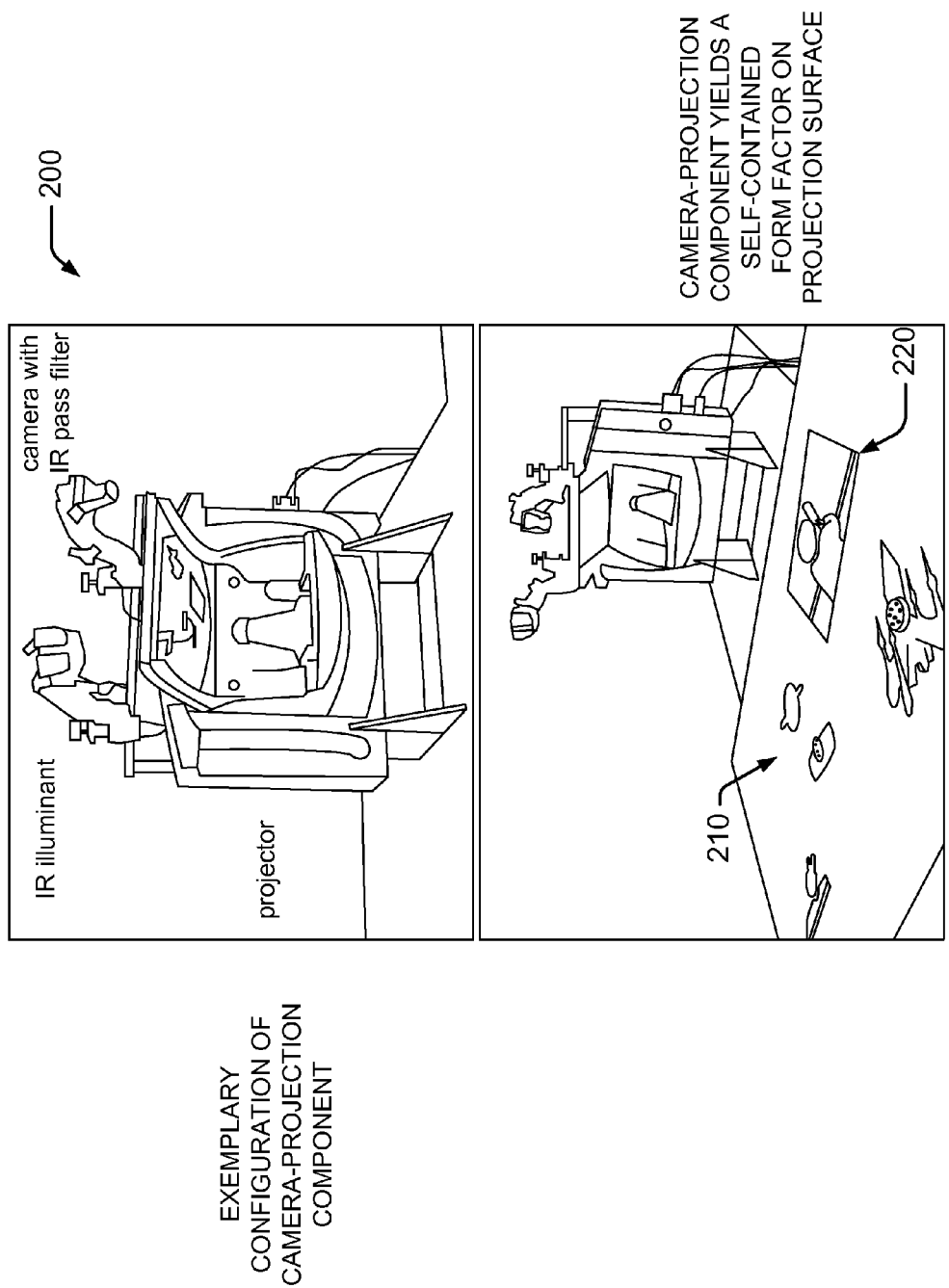
FIG. 2 depicts an exemplary projection-vision system that can be employed to sense and display objects on any surface.

Referring now to FIG. 1, there is a general block diagram of a projection-vision system 100 that can sense and display objects onto any surface using a unique front projection assembly to facilitate creating an interactive surface or workspace. The system 100 includes a camera-projection component 110 that comprises a projector, at least one camera, and an infrared illuminant which are assembled as a single piece that is designed to sit on a flat surface such as a table, desk, wall, or floor. FIG. 2 illustrates an exemplary configuration 200 of the projection vision system 100 and will be described together with FIG. 1.

By configuring the system as a single unit, it can be made compact and more portable for user convenience. With portable projection systems, one thought that often comes to mind is calibration—or rather re-calibration which is often required in a conventional projection system after the system is moved. However, in an exemplary configuration of the subject system 100 as represented in FIG. 2, the projector employed can be an NEC WT600 DLP projector which can project a 40" diagonal image onto an ordinary horizontal surface. Four game pieces 210 and a real piece of paper 220 are detected on the surface in FIG. 2.

The NEC WT600 is an unusual projector in that it uses four aspheric mirrors (no lenses) to project a normal 1024×768 rectangular image from a very oblique angle, and at extremely short distance. For a 40" diagonal image, the WT600 requires 2.5" between its leading face and the projection surface, while a 100" diagonal image is obtained at a distance of 26". These characteristics make it very well suited for the system 100, in that it allows for the projector to sit directly on the projection surface (on a short pedestal), rather than be hung suspended over the surface.

As in other projection-vision systems, the scene (display space) can be illuminated with an infrared source and all but infrared light can be blocked to the camera with an infrared-pass filter. This effectively removes the projected image from the scene. The projector provides a natural place to mount one or more cameras and an infrared illuminant. By rigidly mounting the cameras and illuminant to the projector, the calibration of the vision system to the display is the same regardless of where the unit is situated and may be determined at the factory.

One method to perform sensing and detection of objects on the surface is to use two cameras and simple stereo calculations as has been done in traditional systems, but in the subject system 100, one camera is employed combined with image techniques that allow touch detection by examining the shadows of objects, detailed later in FIGS. 8-11. The IR illuminant is positioned off axis from the single camera so that objects above the surface generate controlled shadows indicating height. In this particular exemplary configuration (in FIG. 2), the system 100 uses an Opto Technology OTLH-0070-IR high power LED package and a Sony ExView analog grayscale CCD NTSC camera. The ExView was chosen for its high sensitivity in the near infrared domain. To minimize the size of the overall unit, the camera can be mounted near the top of the projector, giving an oblique view of the surface. A very wide angle micro lens (2.9 mm focal length) is suitable to capture the entire projected surface. To mitigate such an oblique camera view, a shift lens configuration may be employed or the camera can be embedded with the projector in such a way that they share the same optical path.

Once configured, the camera-projection component 110 can project images onto a display surface 120. The images can be rectified by way of an image processor component 130 and then displayed as a display image. The rectification process can involve performing calculations on an input image. Any calculations made on the image by the image processor component can be related directly to the displayed image. That is, a tracked position in the rectified image can be readily mapped to the corresponding position in the displayed image. For example, rectification can be employed to remove any undesirable distortion from the input image. In practice, the camera-projection system can utilize a wide angle lens which can impart significant barrel distortion on the input image; while the oblique position of the camera imparts a projective distortion or foreshortening. The image processor component 130 can remove both distortions via standard bilinear interpolation techniques. Parameters necessary to correct for lens distortion can be recovered by an off-line procedure.

Figure 4:
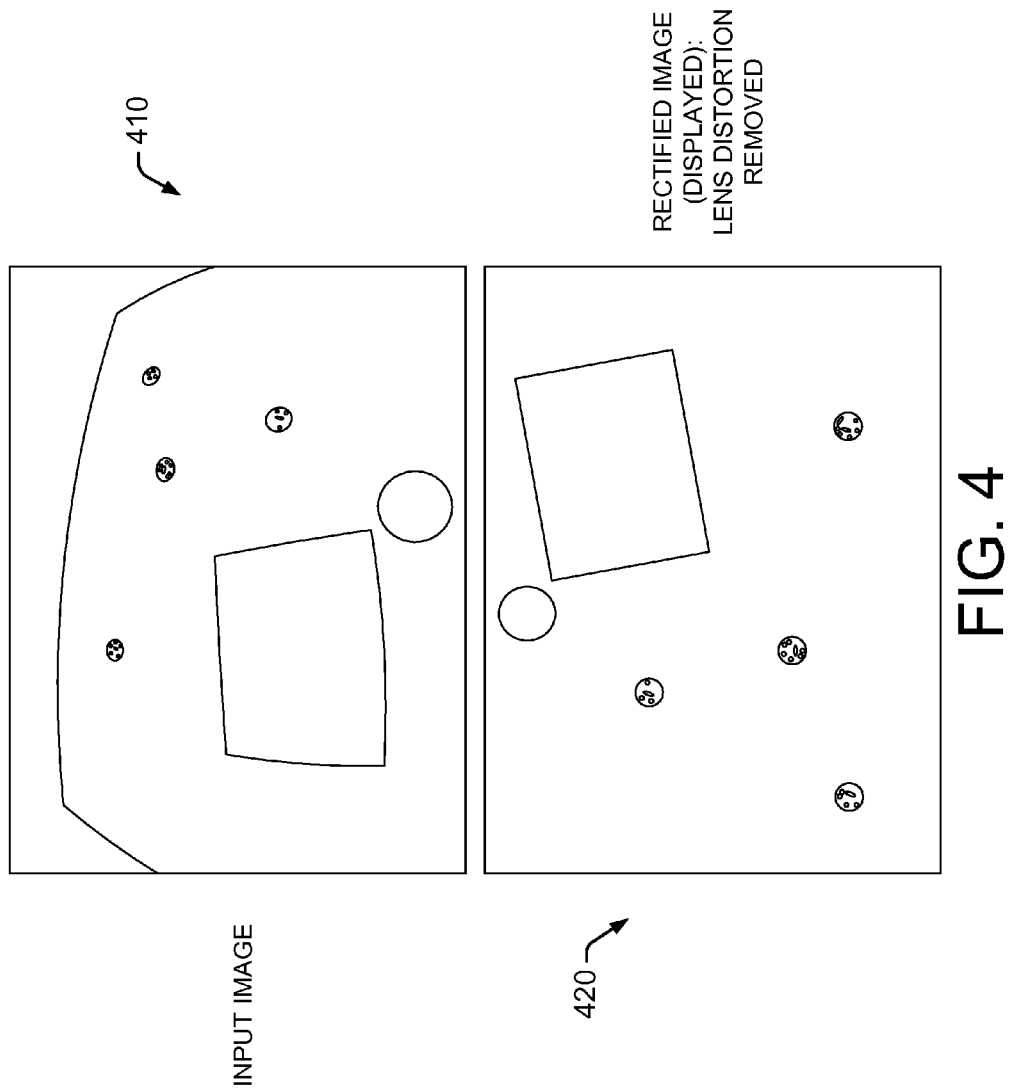
FIG. 4 demonstrates an input image and a corresponding rectified image that is displayed on an interactive surface.

The projective transform is determined by finding each of the four corners of the projected display by placing infrared reflective markers (paper) on the surface at known locations indicated by the projected image. Image rectification is illustrated in FIG. 4, infra. Note that due to the configuration of the system 100 and the assumption that the unit sits on the projection plane, this calibration step need not be performed again when the unit is moved.

Any objects placed on or hovering over the display surface can be detected, recognized, and/or tracked using the image processor component 130. In particular, the image processor component 130 can detect objects touching the surface without relying on special instrumentation of, underlying, or on the surface. Thus, the system 100 can operate on any flat surface. More detailed information regarding the image processor component 130 can be found in the discussion for FIGS. 4-11, infra.

Figure 3:
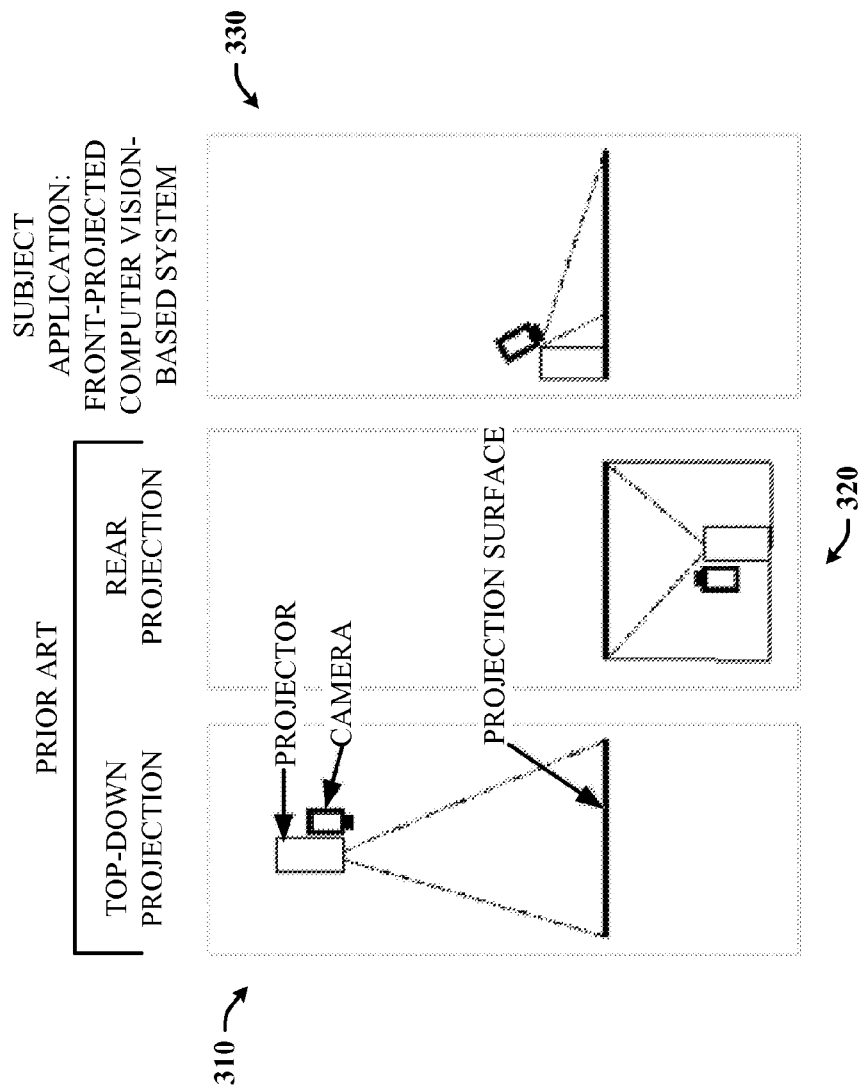
FIG. 3 is a block diagram that compares conventional projection systems with the subject projection system.

Turning now to FIG. 3, there is a block diagram that compares conventional projection systems with the subject projection-vision system (FIGS. 1 and 2). Most conventional projection-vision systems either employ front projection with projector and camera mounted above (310) or rear projection with projector and camera in a cabinet (320). Unfortunately, there are disadvantages with both of these arrangements.

The top-down approach in 310 is rather popular since such mounting considerations are often necessary due to the throw requirements of projectors and the typical focal length of video cameras. However, ceiling installation of a heavy projector can be more than challenging, dangerous, can require special mounting hardware not easily accessible by most consumers, and for all practical purposes may be best left to professional installers, which involves additional costs and less accessibility to the general public. Once installed, this top-down system and projection surface cannot be readily moved without requiring tedious or time-consuming re-calibration of the system. In addition, minor vibrations present in many buildings can create problems during operation and can make it difficult to maintain calibration. There is also a possibility of occlusion of the projected image by a user's head and/or hands as they interact with the top-down system.

A second common approach is the rear projection set-up (320) wherein the projector and camera are placed behind a diffuse projection screen. While this enables the construction of a self-contained device, eliminates some occlusion problems, and permits the placement of visual codes on the bottom of objects, it is challenging at best to construct such a configuration with a large display area that also provides users with sufficient room to put their legs under the table surface so that they may sit comfortably at the table. Furthermore, a dedicated surface is required and the resulting housing for the projector and camera can be quite large and thus cumbersome and inconvenient for "anywhere" consumer use. It also presents significant manufacturing and production problems which may hinder yielding a marketable product.

Contrary to these common approaches, the subject configuration 330 employs a camera and projector sitting off to the side of the active (projection) surface which mitigates many if not all of the drawbacks associated with typical projection-vision systems. In fact, the application of this projector has a number of advantages. First, it avoids the often difficult and dangerous overhead installation of the projector. Second, it is reasonable to assume that the plane of the surface holding the projector is the projection plane. If the camera and illuminant are rigidly mounted to the projector as shown in FIG. 2, there is no need to re-calibrate the camera and projection to the surface when the unit is moved. Similarly, since the height of the camera and projector above the surface is constant, there are no problems related to adjusting focal length of either the camera or projector when the unit is moved.

Furthermore, with the oblique projection, occlusion problems typical of conventional front-projected systems are minimized. For example, it is possible for the user to stand over the system without their head occluding the projected image. Finally, a 40" diagonal projection surface which can be offered by the system is adequate for many advanced interactive table applications, including complex gaming scenarios that go beyond simple board games and manipulation of multiple photos, printed pages, etc.

As previously mentioned, FIG. 4 demonstrates image rectification. In particular, initial image processing can remove lens distortion effects from the input image 410 and matches the image to the display. The corresponding rectified image 420 is registered with the displayed image. With image rectification, the input image 410 and projected image are brought into one to one correspondence (e.g., a rectangular object on the surface appears as a rectangular object in the image at the same (scaled) coordinates). One limitation of this process is that, due to the oblique view of the camera, objects further away from the unit may appear at a lower resolution. Consequently, the minimum effective resolution on the surface may be less than that of the acquired image (640×480 pixels).

Figure 5:
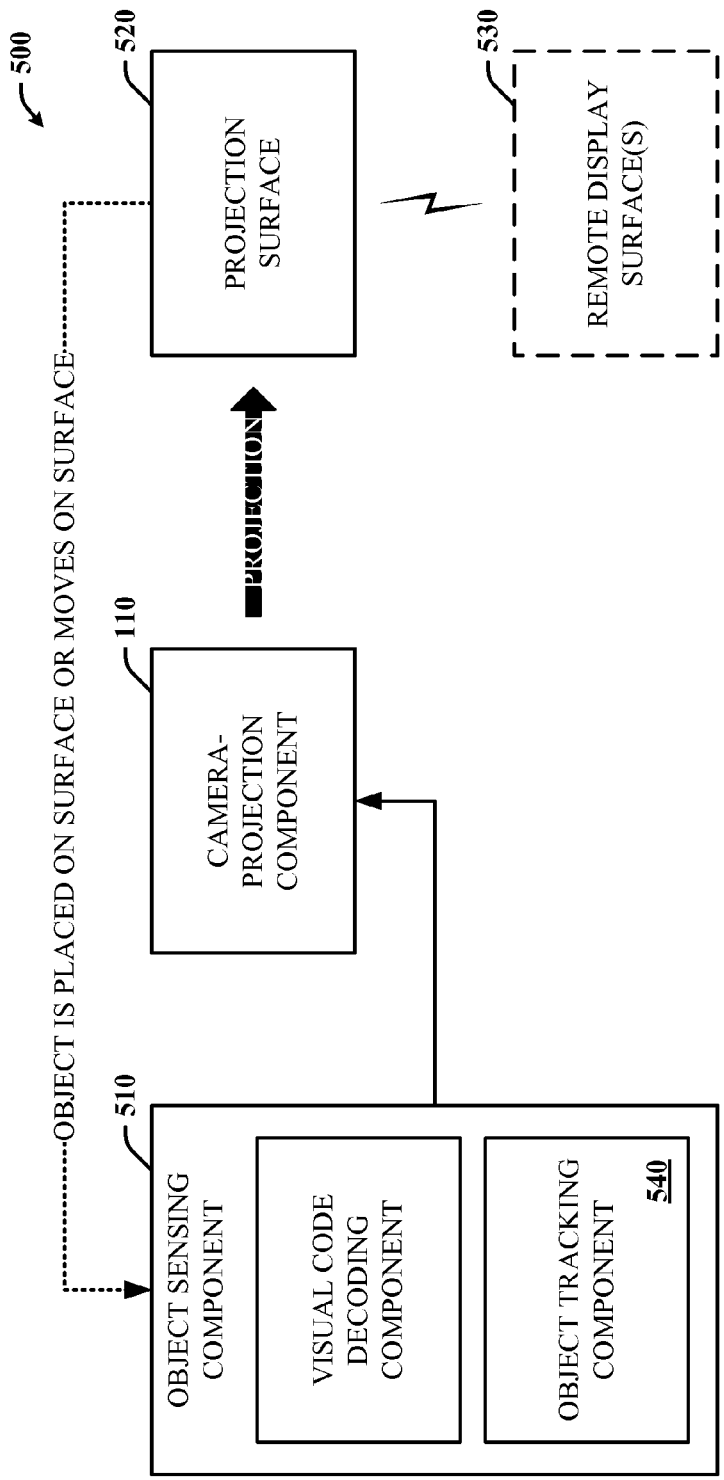
FIG. 5 is a block diagram of a projection-vision system that can sense visual coded objects touching any interactive surface.

Turning now to FIG. 5, there is a block diagram of a projection-vision system 500 that can sense visual coded objects on any interactive projection surface. The system 500 can include an object sensing component 510 which can detect that a visual coded image is present on the projection surface 520 or has moved to a new position on that surface 520. Once detected, the coded image can be captured by the camera-projection component 110 and then subsequently projected back on the projection surface 520 as a virtual object or onto other remotely connected display surfaces 530.

Visual codes have been applied in various augmented reality and table scenarios, where they can be used to identify potentially any object large enough to bear the code without recourse to complex generalized object recognition techniques. In tabletop, floor, or even wall scenarios, for instance, such visual codes are especially useful to locate and identify game pieces, printed pages, media containers, knobs, and other objects that are generic in appearance but may vary in application semantics. As a knob, for example, an identified piece could adjust the color and contrast of a digital photo. A number of visual code schemes are used in augmented reality research. Here, a code format and algorithm designed for the systems discussed herein is outlined. This code is particularly fast and can be implemented on GPU hardware currently available and requires no search to determine code orientation. Generally the problem of designing a code format is one of balancing the opposing goals of obtaining a simple detection algorithm that works with the various transformations observed (e.g., translation, rotation) while supporting a useful number of code bits.

In the case of calibrated tabletop (or any other surface) vision systems, including the subject system, where we may be interested in game pieces on the surface, for example, the system can assume that each instance of the code appears in the image with known, fixed dimensions, thus simplifying the recognition and decoding process. The design of the subject code, illustrated in FIG. 6, was driven from two observations. First, the presence and orientation of strong edges in the image may be computed using uncomplicated, fast image processing techniques such as the Sobel filter. Thus, if the code has a distinct edge as part of the design, the orientation of that edge can determine the orientation of the instance of the code. Secondly, if the code design supports significantly more bits than is needed for the application (e.g., an application may require only 12 unique code values, one for each of the game piece types in chess, but the 12 bit code supports 4,096 unique codes values), then the code values may be chosen such that if one is found through any process, the system is willing to take it as an indication of a valid instance of the code. These two observations used together make for a practical detection algorithm, as follows:

1. Compute the edge intensity and orientation everywhere in the image using the Sobel filter.
2. For each pixel with sufficiently high edge intensity, use the edge orientation to establish a rotated local co-ordinate system.
   a. In the rotated coordinate system, read each pixel value in the rectified image corresponding to each bit in the code according to the code layout. Threshold each based on the minimum and maximum value read, to arrive at a code value.
   b. Check the code value against a table of codes used in the current application. There is a candidate instance if a match is found.
3. Rank each candidate according to some criteria (e.g., difference between maximum and minimum pixel values read). Iterate until no more candidates: Take top ranked candidate as valid code instance, and eliminate remaining candidates that overlap.

Figure 6:
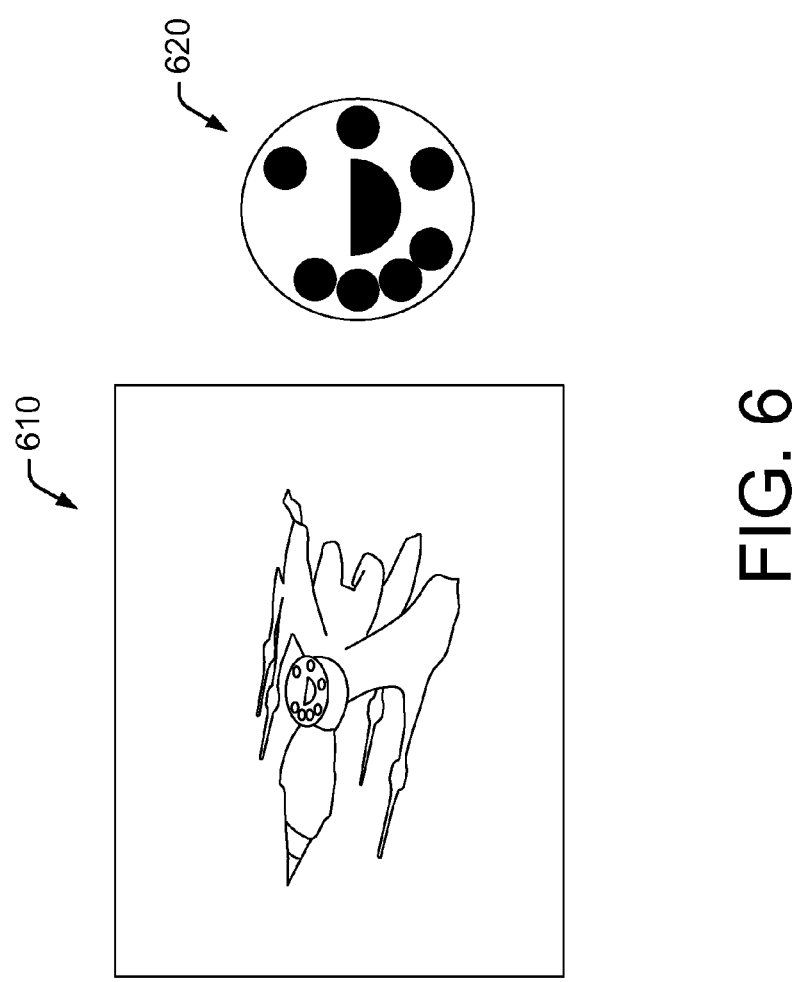
FIG. 6 demonstrates a 3D graphics model which has been projected onto an identified game piece (left) and a 12 bit code given by the pattern around the edge (right).

In practice, depending on the code bit depth, the number of application code values required and the nature of potential distracters in the image, it may be necessary to add a further step that verifies the instance. For example, consideration of image locations can be limited to those that appear to be the center of circular contours of the game piece diameter. Such contours can be found quickly using the Hough transform applied to circles, reusing the edge orientation information computed above: a 2D histogram (image) representing the presence of circles centered at a given point is created by, for each pixel in the input image, calculating the center of the circle of a given radius and edge orientation found at the input coordinates, and incrementing the histogram at the calculated center. Each point in the resulting histogram indicates the likelihood of a circle of the given radius centered there. FIG. 6 illustrates an exemplary visual code. In particular, a 3D graphics model is projected onto an identified game piece 610 with orientation determined by strong edge in the center of the pattern, and 12 bit code given by the pattern around the edge 620. One limitation of this scheme is that the user's hand can occlude a visual code. Without hysteresis or integration with the shadow-based touch algorithm, the system will conclude that the piece has disappeared. Shadow analysis as discussed in FIGS. 8-11 can be added to the visual code decoding to resolve this.

The object sensing component 510 can also include an object tracking component 540 that can track the movement of objects in real-time on the projection surface 520. In particular, real objects can be captured and when detected, can cause their corresponding virtual objects to be projected on the surface 520 for further manipulation or modification. For example, consider making a real charcoal drawing on paper. This drawing could then be captured to an image precisely using the page tracking information, and then later projected back onto the surface as a virtual object, or even onto a blank piece of paper, or another work in progress.

For instance, with regard to page tracking, the object tracking component 540 can employ a page tracking algorithm that is based on a Hough transform with the Sobel edge and orientation information as input. This gives a histogram over orientation and perpendicular distance to the origin which indicates the presence of strong lines in the image. Given the dimensions of a page size to detect, it is straightforward to find appropriate pairs of parallel lines a set distance apart. Two pair of parallel lines perpendicular to each other is verified as a page by ensuring that there are strong edges along a significant fraction of the lines in the original Sobel image. This proportion can be tuned to allow for pages to overlap (e.g., FIG. 7). With this algorithm, multiple paper pages of known dimensions may be continuously tracked by the system 500 with enough precision to project a virtual image on the page as it is moved around the surface. Presently, multiple pages are tracked and disambiguated purely by assuming small frame to frame movement—not page appearance. This tracking process also allows for pages to be turned 180 degrees recognizably. Multiple (known) page sizes may also be simultaneously detected with minimal additional computation.

Figure 7:
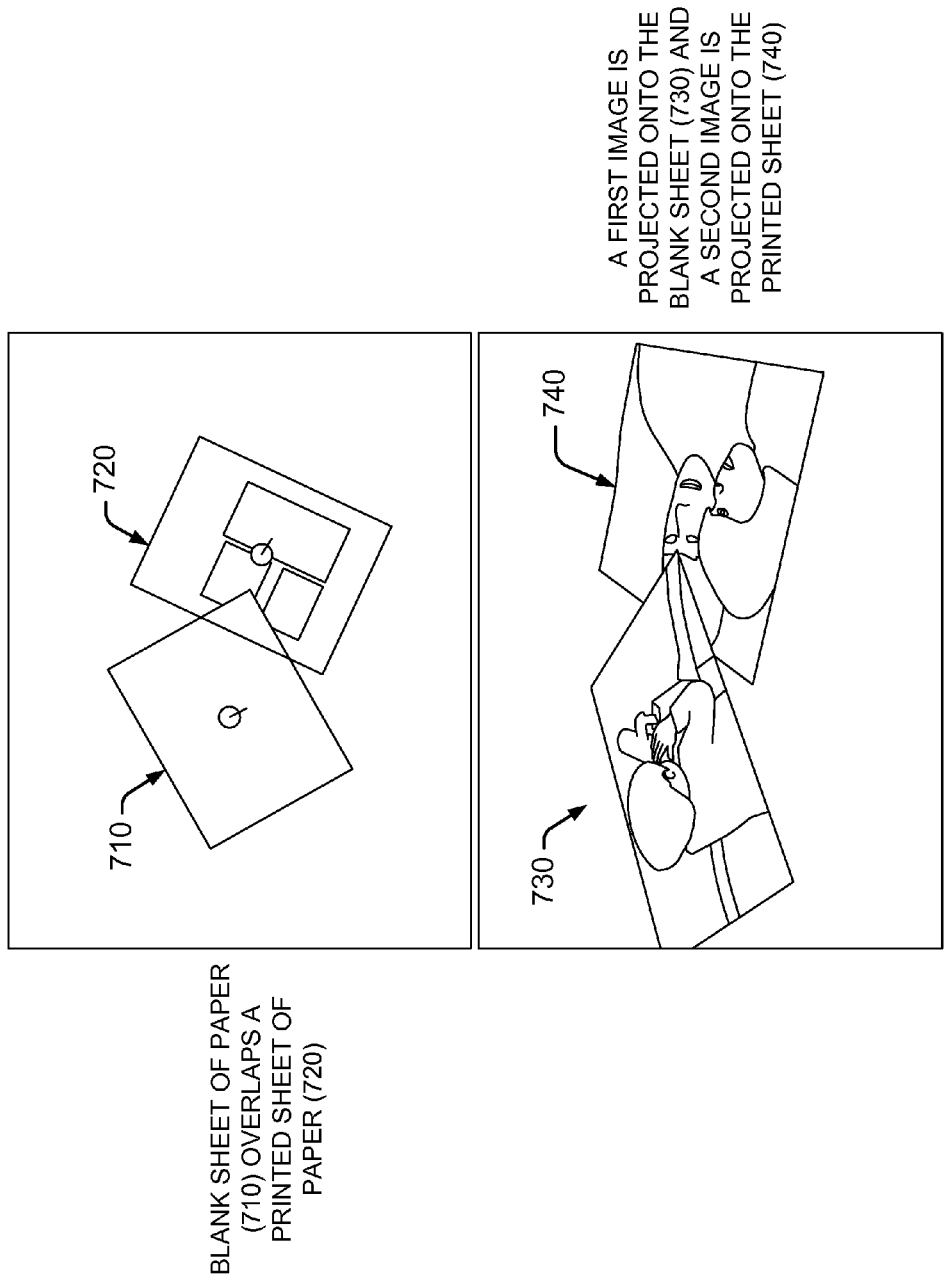
FIG. 7 demonstrates a blank sheet overlapping a printed sheet (top view) and the same image rendered on a surface having two different images projected onto each sheet (bottom view).

FIG. 7 shows page detection results and its application to the projection of video onto physical pages. In particular, the figure demonstrates a blank sheet 710 overlapping a printed sheet 720 and two different images are then projected onto each sheet 730, 740. In practice, imagine that a different movie is projected onto each sheet. As a user moves around the surface (or table), each page can be moved around the surface according to where the user is standing or sitting for optimal viewing. It should be appreciated that the same image can be projected onto each page such as when there are multiple users around the table. Furthermore, any projected data can be communicated to a separate or remote display surface. For example, imagine that a user is giving a presentation using the main table or projection surface. One or more other users sitting in the same room or in a different room can also view the projected content in real-time.

Figure 8:
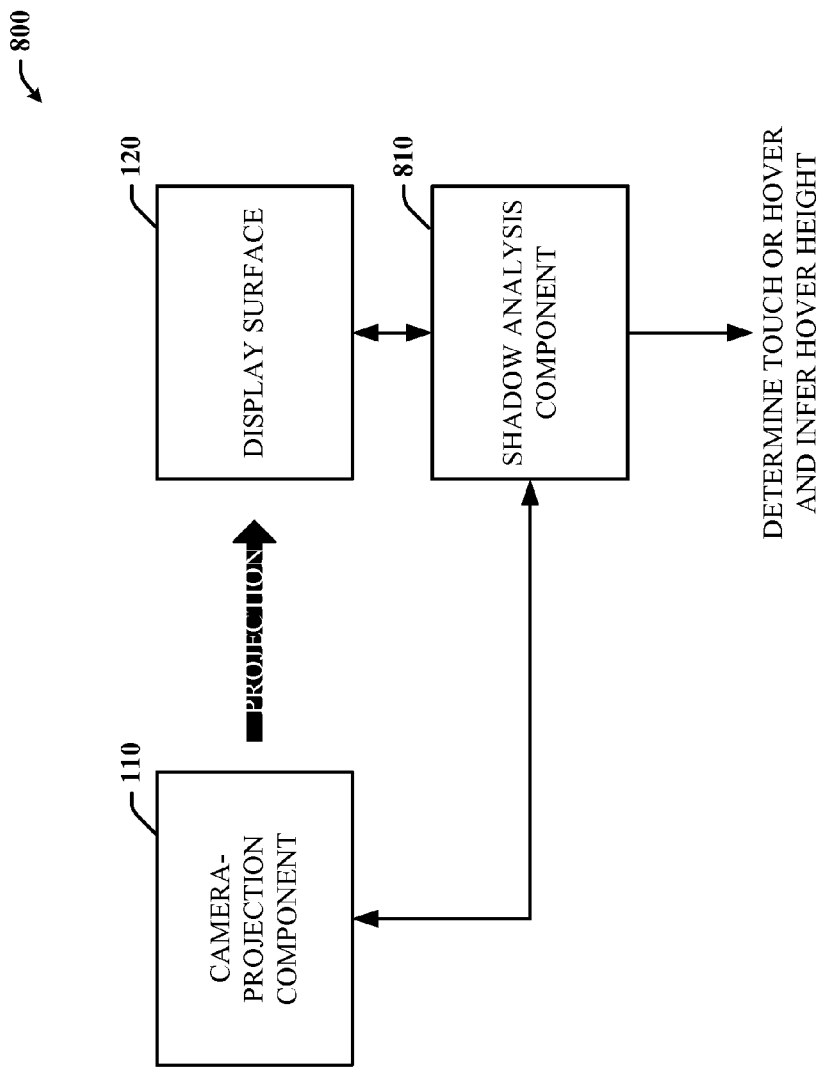
FIG. 8 is a block diagram of a projection-vision system that can determine whether objects are hovering or touching the surface via shadow analysis.
Figure 9:
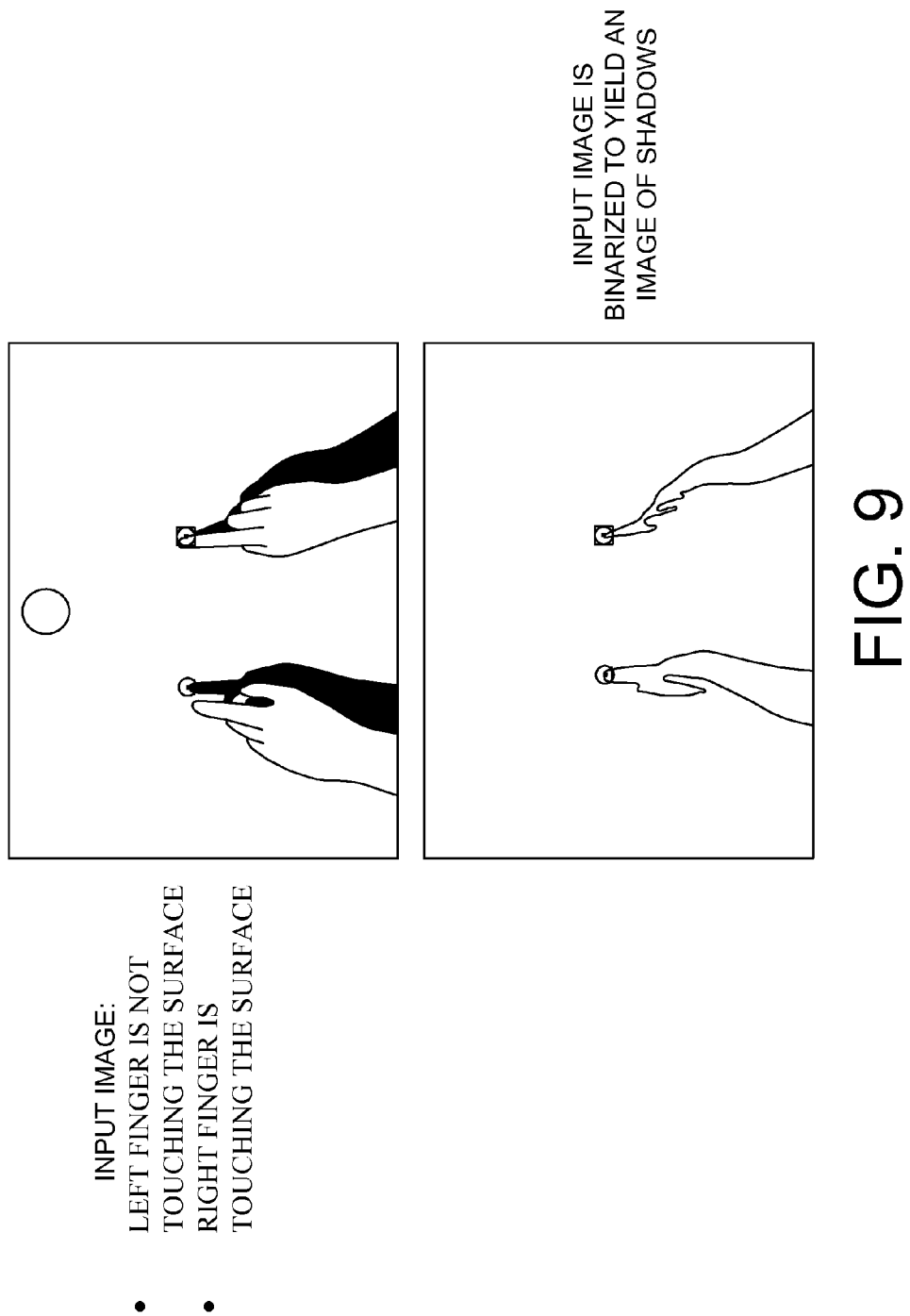
FIG. 9 demonstrates an aspect of shadow analysis as it is employed to distinguish between hovering over the interactive surface and touching the surface, and in particular an input image and a resulting binarized image.
Figure 10:
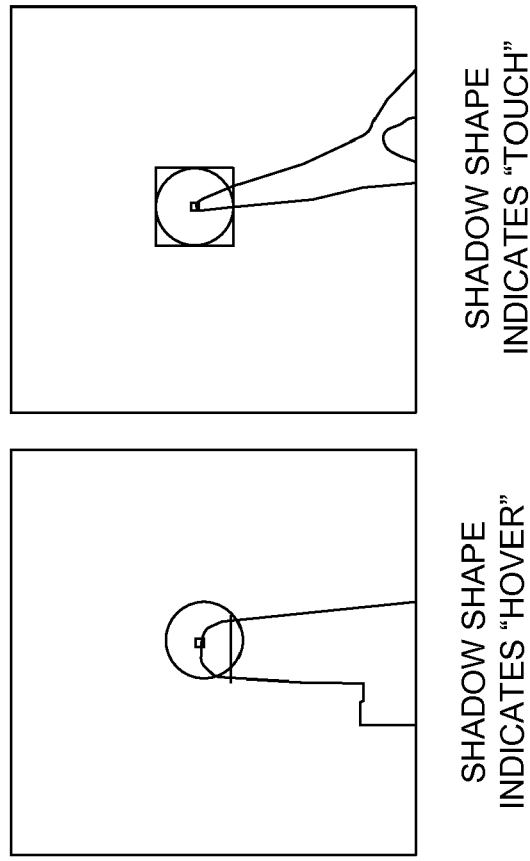
FIG. 10 depicts a close-up view of the binarized image in FIG. 9 to more clearly distinguish between shadows on or over the interactive surface.

Turning now to FIG. 8, there is a block diagram of a projection-vision system 800 that can determine whether objects are hovering or touching the surface by way of shadow analysis. FIGS. 9 and 10 provide a visual demonstration. The system 800, and in particular a shadow analysis component 810, can detect whether an object is touching the surface by examining a change in appearance of shadows as an object approaches the surface. FIG. 9 shows the (rectified) input image with two hands in the scene. The hand on the left is a few inches above the surface, while the index finger of the hand on the right is touching the table surface. Note that as the index finger approaches the surface, the image of the finger and its shadow come together, with the finger ultimately obscuring the shadow entirely at the point where it is on the surface. Because the illuminant is fixed with respect to the camera and surface, it should be possible to calculate the exact height of the finger over the surface if the finger and its shadow are matched to each other and tracked. This height could be used as a hover signal for cursor control or 3D cursor control.

Finger tracking may be performed however it would require making some assumptions about the appearance of the surface and fingers (e.g., that fingers and the surface have significantly different brightness). With shadow analysis, recovering the shadow reliably requires only that the surface reflect infrared and that the device's infrared illuminant is significantly brighter than stray infrared in the environment. Both assumptions are reasonable given that the user is likely to place the device on a surface where the projection has good contrast and brightness (e.g., not on a black surface or in a very bright room). A shadow image can be computed from the rectified input by a simple thresholding operation (see FIG. 9). Candidate finger positions are generated by finding the highest (closest to the device) point on each of the distinct shadows in the image which enter the scene from the bottom of the image (away from the device). These conditions typically yield a candidate for the most forward finger of each hand on the surface, if the user is reaching in from the front, and rejects other objects on the surface that may generate their own shadows. Such finger candidates may be found quickly by computing the connected components of the smoothed shadow image. Whether the finger is touching the surface may be determined by analysis of the shape of the shadow. FIG. 10 shows the shadow at a fingertip for a finger on and off the surface. The tracking component 810 can threshold the width of the finger shadow computed at a location slightly below the topmost point. In addition, this detection algorithm can be augmented by a verification algorithm, however, the provision that the candidate finger must lie on a shadow that extends to the bottom of the image can tend to limit false positives if there are few other physical objects on the surface. Objects that are on the surface can be considered part of the shadow if they are particularly dark and can corrupt touch detection if they are nearby. Pointy dark objects are likely to generate false positives only if they extend to the bottom of the image and thus mimic arm shadows.

The images in FIGS. 9 and 10 demonstrate recovery of one finger per hand but it should be appreciated that one or more fingers per hand could be detected in the manner described herein. More sophisticated finger shape analysis can be used to recover multiple fingers per hand perhaps at some cost in robustness. Because very few assumptions about the shape of the hand are made, the pose of hand is not critical, and so the hand can be relaxed. The precision of touch location is limited by the resolution of the imaged surface, which has been subjectively estimated with grating charts to be about 3-4 mm (approximately 4.5 image pixels). Simple trigonometry can be used to show that this spatial resolution implies a roughly equal resolution in the determination of height and therefore touch accuracy by the method described above. This agrees with the subjective experience of using the system.

Figure 11:
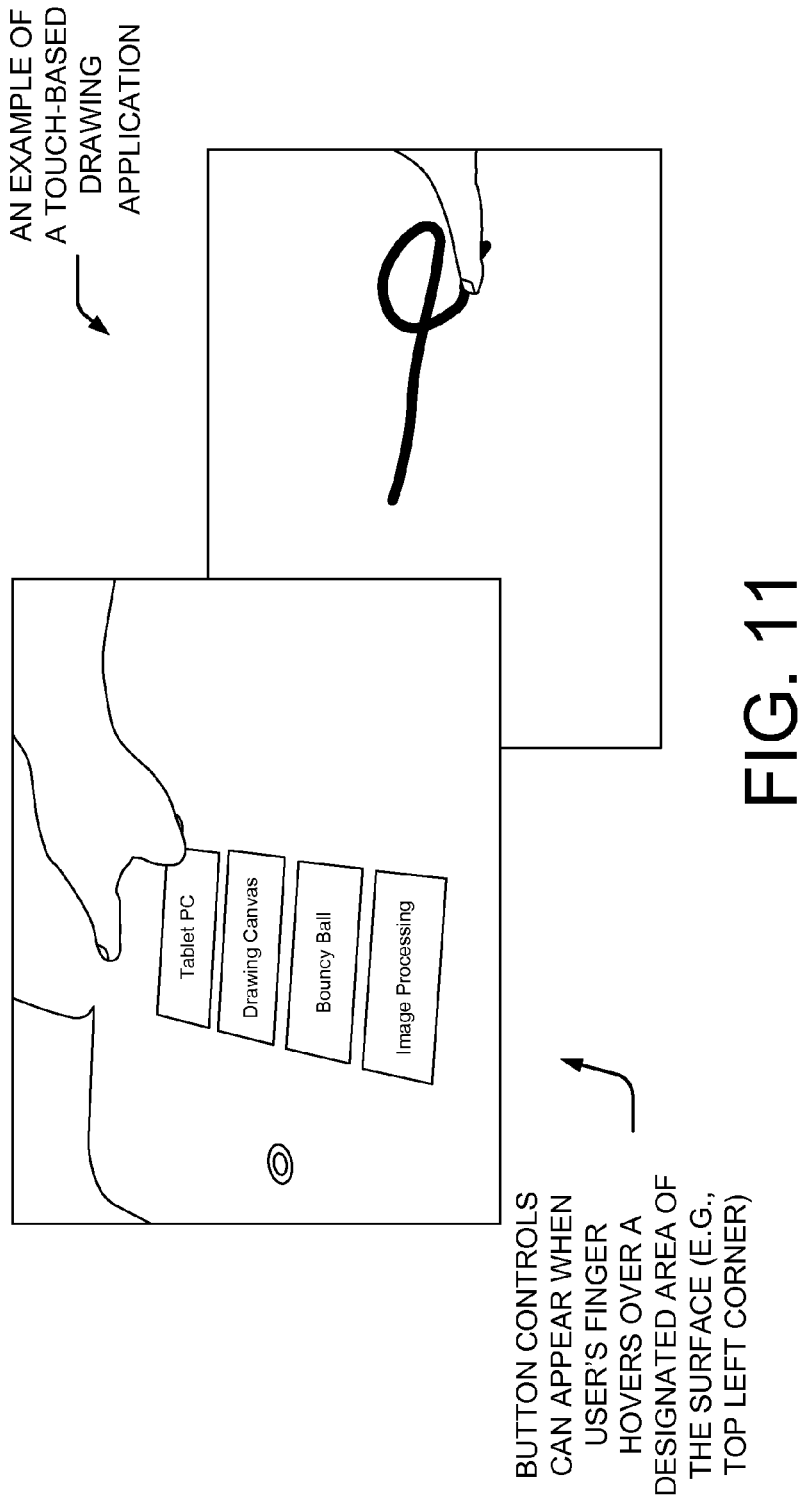
FIG. 11 demonstrates at least two exemplary applications of a projection-vision system.

FIG. 11 depicts exemplary applications of a finger detection scheme and a touch-based drawing application. In particular, the finger detection scheme can be employed to open a button control panel or window such as when a finger is determined to hover or touch a designated area of the surface. For example, a hovering finger can trigger the button panel to appear and a finger touch can press the button. It should be understood that the finger detection scheme (to determine touch or hover with respect to any surface) can be integrated in a variety of computing devices such as laptops, tablet PCs, PDAs, and mobile phone technologies.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 12:
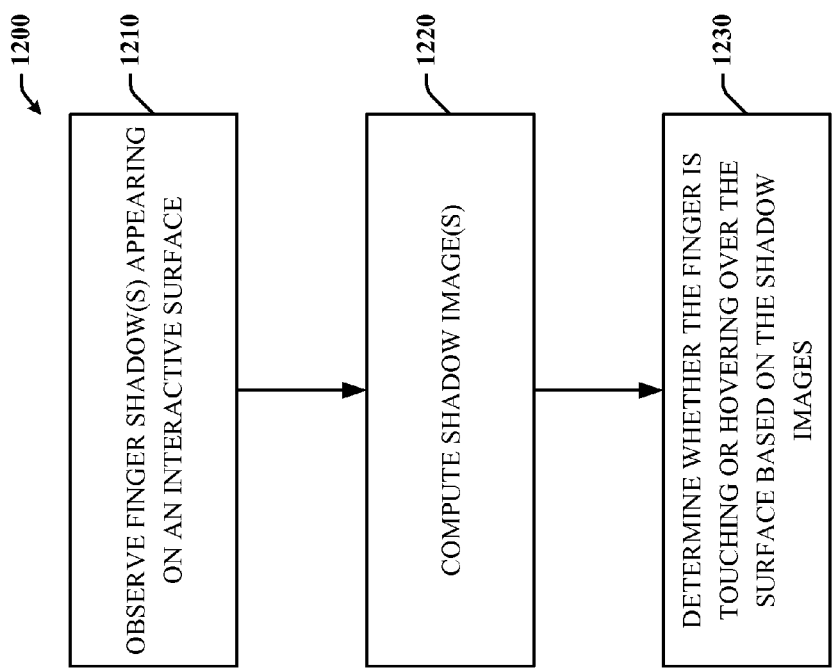
FIG. 12 is a flow diagram illustrating an exemplary methodology that facilitates determining whether an object is touching or hovering over the interactive surface.

Referring to FIG. 12, there is a flow diagram illustrating an exemplary methodology 1200 that facilitates determining whether an object is touching or hovering over the interactive surface in connection with a projection-vision system. The method 1200 involves observing finger shadow(s) as they appear on an interactive (or projection) surface at 1210. At 1220, one or more shadow images can be computed and based on those images, the method can determine whether the one or more fingers are touching or hovering over the surface at 1230. When either a hover or touch operation is determined, an appropriate action can follow. For example, if the hover is detected over a particular area of the interactive surface, it can trigger a menu to appear on the surface. A user can select menu options by using touch (e.g., touching the option to select it). Alternatively, hovering can prompt a selection to be made or can prompt some other pre-set operation to occur. Similar programming can be done with respect to a detected touch on the surface.

Figure 13:
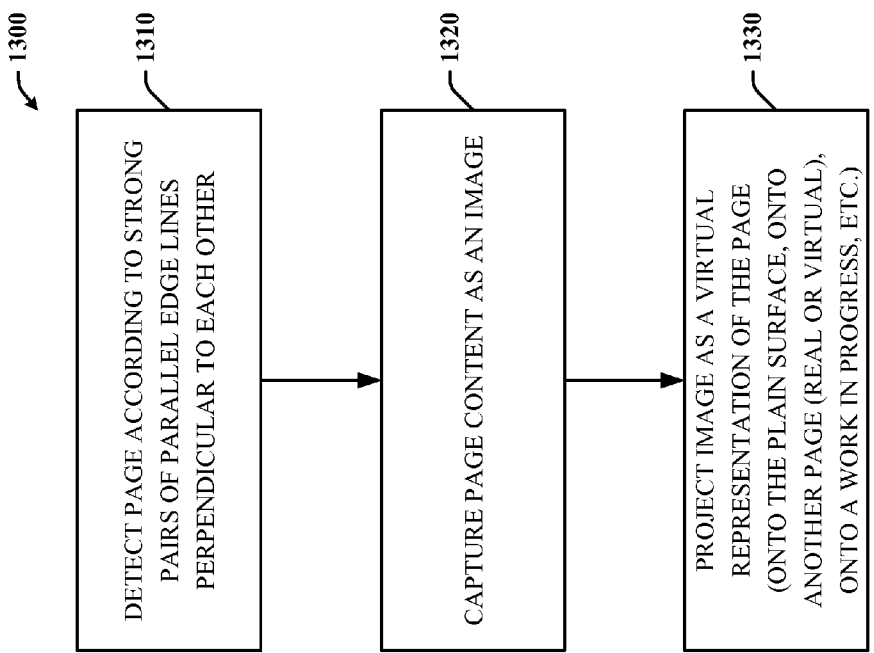
FIG. 13 is a flow diagram illustrating an exemplary methodology that facilitates page tracking and projecting images on such pages.

Turning now to FIG. 13, there is a flow diagram illustrating an exemplary methodology 1300 that facilitates page tracking. The method 1300 involves detecting the presence of at least one page at 1310. This can be accomplished in part by the presence of strong pairs (two) of parallel edge lines that are perpendicular to each other. Page overlap can also be accounted for and detected. At 1320, the page and/or its content, if any, can be captured as an image. At 1330, the image can be projected (as a virtual representation of the real page) such as onto the projection surface, onto another real or virtual page, or onto another work in progress.

Moreover, the projection-vision system as described herein offers a compact and readily portable unit that can be moved during use without requiring re-calibration of the system. The system can be employed for work, play, entertainment, or any other purpose. The exemplary configurations of the system are included merely for demonstration of the various components arranged in a single unit but are not meant to limit the system to a particular size, dimension, or configuration. Processors and memory storage can also be included in the configuration. When put into use, the projection-vision system can project virtual representations of items or objects and permit manipulation or other interaction of them by one or more users. Thus, the projection surface becomes an interactive surface, allowing users to perform various computing operations, content modification, and navigation of the projected content such as panning, zooming, and scrolling. In particular, flow field technology can be employed or integrated with the projection-vision system to facilitate such navigational techniques when viewing projected images (e.g., map, architectural plans, etc.)

Figure 14:
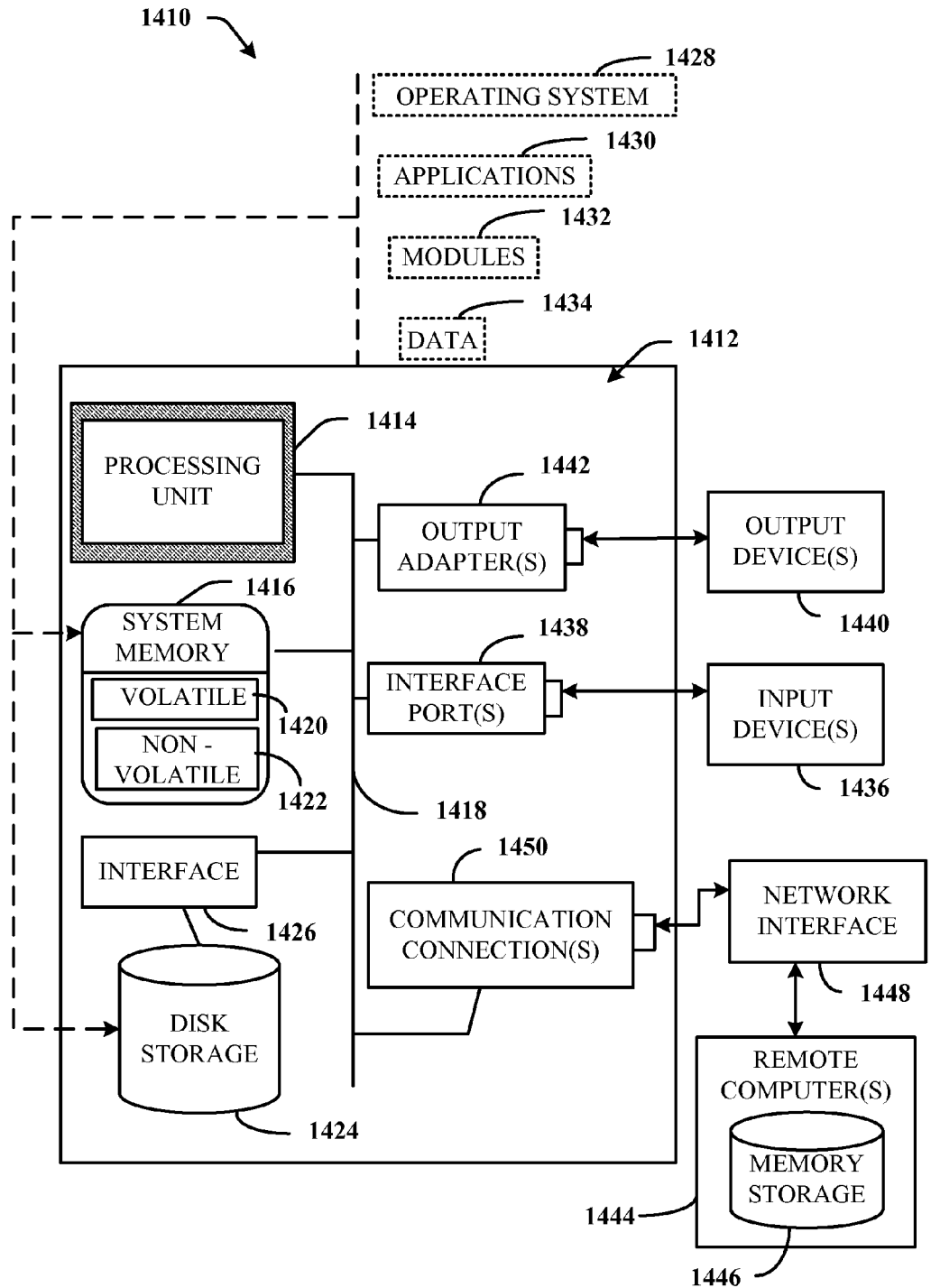
FIG. 14 illustrates an exemplary environment for implementing various aspects of the invention.

In order to provide additional context for various aspects of the subject invention, FIG. 14 and the following discussion are intended to provide a brief, general description of a suitable operating environment 1410 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the subject invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A projection-vision system that facilitates sensing and projecting objects as images, comprising:
    a projection surface on which at least one visual coded image is presented; and
    an object sensing component, executed by a processor and stored in memory, that detects that the visual coded image is present on the projection surface by:
        computing an edge intensity and edge orientation for each pixel in the at least one visual coded image;
        using the edge intensity and edge orientation to determine code values for each pixel; and
        obtaining a candidate instance of the code by checking the code values against a table of codes, and if a match exists, the match is the candidate instance of the code.

2. The system of claim 1, wherein using the edge intensity to determine code values for each pixel comprises:
    establishing a rotated local coordinate system utilizing the edge orientation for each pixel with a high edge intensity;
    reading each pixel value in a rectified image in the rotated local coordinate system, each pixel value in the rectified image corresponds to each bit in a code; and
    determining a code value by thresholding each pixel based on a minimum and maximum pixel value read.

3. The system of claim 1, the visual coded image comprises a bar code.

4. The system of claim 1, further comprising an object tracking component, executed by the processor and stored in memory, that tracks at least one page on the projection surface in part by detecting at least two pairs of strong edge parallel lines that are perpendicular to each other.

5. The system of claim 4, the object tracking component recognizes overlapping pages.

6. The system of claim 4, further comprising a camera-projection component, comprising a projector with at least one camera and an illuminant, wherein the illuminant and the at least one camera are rigidly mounted to the projector.

7. The system of claim 1, farther comprising a shadow analysis component, executed by the processor and stored in memory, that computes shadow images of at least one finger on the projection surface to determine whether the finger is touching or hovering over the projection surface.

8. The system of claim 7, the shadow analysis component binarizes the input image to yield at least one shadow image.

9. The system of claim 1, further comprising a rank component that ranks each candidate instance of the code according to some criteria such that a top ranked candidate is taken as a valid code instance and any remaining candidates that overlap are eliminated.

10. The system of claim 1, further comprising one or more remote display surfaces to display content from the projection surface.

11. The system of claim 1, the visual coded image comprises a game piece.

12. The system of claim 1, the object sensing component employs a Sobel filter to compute the edge intensity and the edge orientation for every pixel in the at least one visual coded image.

13. The system of claim 4, the object tracking component employs a Hough transform to detect the at least two pairs of strong edge parallel lines that are perpendicular to each other.

14. The system of claim 6, the camera projection component captures the detected visual coded image and projects the visual coded image back onto the projection surface as a visual object.

15. The system of claim 6, the camera projection component projects at least one image onto the at least one page.

16. The system of claim 6, the camera projection component is positioned off to the side of the projection surface.

17. The system of claim 6, the camera projection component projects the at least one image onto at least one of a real or a virtual page on the projection surface in real time.

18. The system of claim 6, the camera projection component projects a movie in real time.

19. The system of claim 6 is self-contained and portable.

20. The system of claim 7, the shadow analysis component triggers content to appear on the surface when at least one of a touch or hovering is determined.

* * * * *